Sept. 7, 1954 P. W. HAINKE 2,688,224
SELF-PROPELLED ROTARY TYPE MOWING MACHINE
Filed Jan. 2, 1951 2 Sheets-Sheet 1
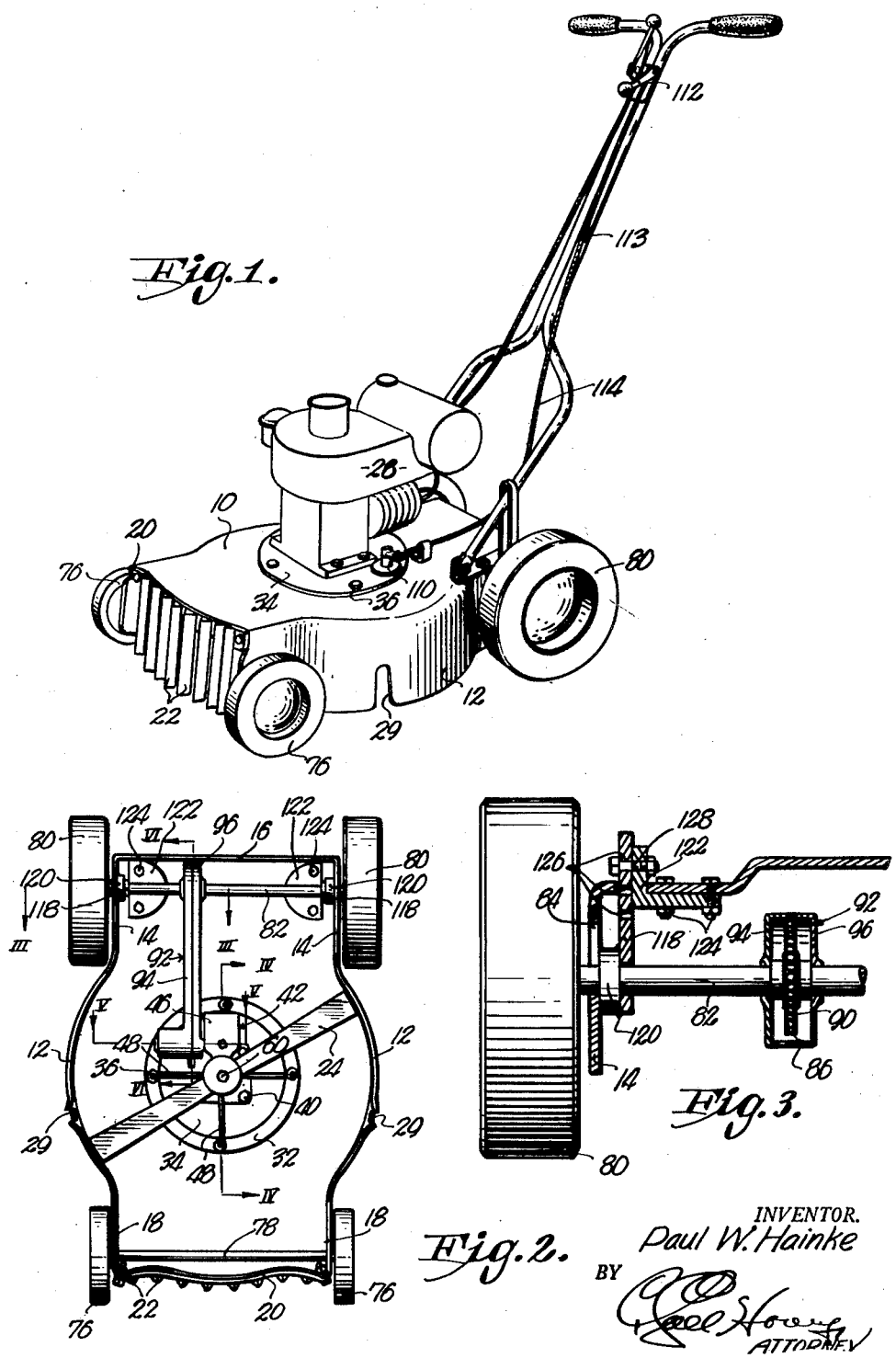
INVENTOR.
Paul W. Hainke Sept. 7, 1954 P. W. HAINKE 2,688,224
SELF-PROPELLED ROTARY TYPE MOWING MACHINE
Filed Jan. 2, 1951 2 Sheets-Sheet 2

INVENTOR.
Paul W. Hainke
BY
ATTORNEY

Patented Sept. 7, 1954

2,688,224

UNITED STATES PATENT OFFICE 2,688,224

SELF-PROPELLED ROTARY TYPE MOWING MACHINE

Paul W. Hainke, Hutchinson, Kans., assignor to The Paul Hainke Mower Corporation, Inc., Hutchinson, Kans., a corporation of Kansas Application January 2, 1951, Serial No. 203,941

3 Claims. (Cl. 56—25.4)

1

This invention relates to lawn mowers of the type having a vertical cutter blade spindle mounted upon a substantially horizontal platform that is rendered mobile through the medium of a plurality of ground wheels.

It is the primary object of this invention to provide a lawn mower of the aforementioned character including a prime mover for driving the cutter blade spindle either directly or through conventional gearing, belts or the like, and having means associated with such spindle for imparting rotative force to a wheel and axle assembly, all from a common prime mover and in an inexpensive, highly efficient and simple manner.

The most important object of the present invention is to provide a lawn mower having a single prime mover for driving the cutter blade spindle and one wheel and axle assembly through the medium of a worm connected with the cutter blade spindle but separable therefrom, together with a gear in mesh with the worm and mounted upon an idler shaft having chain and sprocket connection with one of the axles of the mower.

A further object of the present invention is the provision of a lawn mower wherein there is included a simple, inexpensive and easily accessible clutch for permitting full control of forward motion of the mower by the operator thereof.

A still further object of this invention and of equally important nature, is to provide a lawn mower having a wheel and axle assembly attached to the platform through the medium of a pair of arms having adjustable connection with the platform whereby the height of the cutter blade may be easily and quickly changed as desired with a minimum amount of effort and skill.

Other objects include details of construction to be made clear as the following specification progresses, reference being had to the accompanying drawings, wherein:

Figure 1 is a perspective of a self-propelled rotary type mowing machine made pursuant to my present invention.

Fig. 2 is an inverted view thereof.

Fig. 3 is an enlarged, fragmentary, cross-sectional view taken on line III—III of Fig. 2.

2

Figure 4:
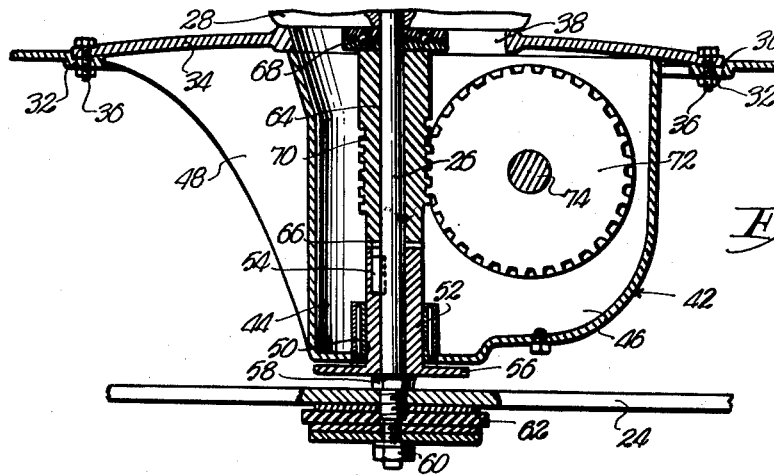
Fig. 4 is an enlarged, detailed, sectional view taken on line IV—IV of Fig. 2.

The lawn mower of this invention is fully illustrated in Fig. 1 of the drawings and includes a horizontal platform 10 having depending arcuate side walls 12 that merge with straight parallel sides 14 at the rearmost end of the mower, which sides 14 are joined by a depending rear wall 16. Likewise, the arcuate side walls 12 of the platform 10 are provided with straight sides 18 joined by an undulated cross-bar 20. Bar 20 supports a plurality of side-by-side, vertical, spaced-apart fingers 22 between which grass, weeds and the like pass when the mower is placed in operation.

The fingers 22 are triangularly shaped in cross-section with one edge thereof leading, all to facilitate the passage of the grass and to aid in lifting the same to a condition where cutting by elongated blade 24 is rendered more efficient. The blade 24 is mounted beneath platform 10 within the arcuate portions 12 thereof and upon a substantially vertical spindle 26. Spindle 26 forms a part of an internal combustion engine or other prime mover 28, or may be connected with the drive shaft thereof if desired in any conventional manner. A pair of opposed slots 29 are formed in the arcuate portions 12 near the forward end thereof for receiving and feeding grass into the blade 24, leaving a free path of travel for the rearmost wheels of the mower as will hereinafter appear.

Platform 10 is provided with a circular opening 30 defined by continuous offset flange 32 that receives a dome-shaped plate 34 secured to the platform 10 by means of bolts or the like 36. Plate 34 is provided with an opening 38 that clears the spindle 26 and is covered by the prime mover 28, the latter being secured to the plate 34 by means of bolts or the like 40.

A hollow case broadly designated by the numeral 42 includes a substantially cylindrical portion 44 and a secondary portion 46 and is integral with the plate 34 from which it depends in communication with the opening 38. A plurality of integral gussets 48 connect the housing 42 with the plate 34.

The case 42 adapted to contain a liquid lubricant mounts a bearing 50 at the lowermost end of the portion 44 thereof for rotatably receiving an elongated tube 52 that circumscribes the spindle 26 and is keyed thereto as at 54. The tube 52 is provided with an out-turned flange 56 at the lowermost end thereof exteriorly of the case 42.

The elongated blade 24 is mounted on the spindle 26 at the lowermost end of the latter exteriorly of the case 42 through the medium of opposed nuts 58 and 60. A plurality of washers including a resilient washer 62 made from rubber or like material, is interposed between the nuts 60 and the blade 24, and these washers, together with the blade 24, are clamped tightly between the nuts 58 and 60.

A sleeve 64 telescoping the spindle 26 is disposed within the portion 44 of case 42 and is connected with the tube 52 at the abutting ends thereof through the medium of lug and notch construction 66. A thrust bearing 68 upon the uppermost end of sleeve 64 bears against the proximal wall of the prime mover 28 that overlies the opening 38. Sleeve 64 is provided with a worm 70 constantly in mesh with a gear 72 mounted within portion 46 of case 42 and rigidly to a transverse shaft 74 journaled within the side walls of casing 42. It is noteworthy that the opening 38 is sufficiently large in at least one direction to receive the gear 72 and permit mounting of the same on shaft 74 traversing the housing portion 46.

Figure 6:
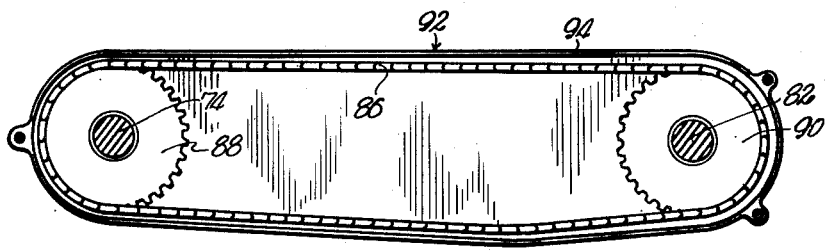
Fig. 6 is a sectional view taken on line VI—VI of Fig. 2.

The entire assembly is rendered mobile through the medium of four wheels 76 and 80, wheels 76 being mounted on an axle 78 extending through the portions 18 of platform 10. A pair of spaced-apart, rear wheels 80 are mounted upon an axle 82 extending through vertical slots 84 in the portions 14 of platform 10. The axle 82 is operably connected with the prime mover 28 through the medium of a continuous chain 86 that is trained over sprocket wheels 88 and 90 on shaft 74 and on axle 82 respectively. The sprocket wheel 88 is disposed exteriorly of the casing 42 and within a substantially L-shaped housing broadly designated by the numeral 92 and including a pair of interconnected sections 94 and 96. The housing 92 also encloses the chain 86 as illustrated in Fig. 6 and extends rearwardly from the shaft 74 to encompass the sprocket wheel 90 as illustrated in Figs. 2 and 3 of the drawings.

A clutch 98 within the housing 92 includes a pair of interengageable sections 100 and 102 on the shaft 74, the section 102 and the sprocket wheel 88 to which it is rigidly affixed, both being loosely mounted on the shaft 74. The clutch section 100 is keyed to the shaft 74 and is connected with a peripherally grooved plate 104 also circumscribing the shaft 74.

A rotatable pin 106 carried by the plate 34 projects through the housing section 94 and carries a secondary pin 108 that rides within the groove of plate 104. Oscillatory movement is imparted to the pin 106 through the medium of a laterally extending arm 110 operably coupled with a handle member 112 through the medium of a flexible cable 114. Handle 112 is mounted at the uppermost end of a handle bar 113 as illustrated in Fig. 1.

Figure 5:
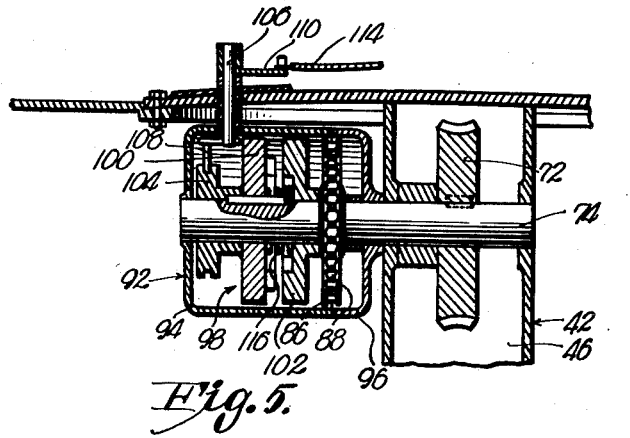
Fig. 5 is an enlarged, cross-sectional view taken on line V—V of Fig. 2.

A spring 116 circumscribing the shaft 74 between the clutch portions 100 and 102 holds the latter normally apart as illustrated in Fig. 5 of the drawings.

The axle 82 is secured to the platform 10 through the medium of a pair of vertical bars 118 adjacent each slot 84 respectively and extending upwardly through the platform 10 as illustrated in Fig. 3. The bars 118 loosely circumscribe the axle 82 at the lowermost ends thereof and each is provided with a bearing 120 for the axle 82. An L-shaped bracket 122 having one leg thereof secured to the platform 10 by means of bolts 124 has the other leg extending upwardly through the platform 10 next adjacent the corresponding bar 118. Bar 118 is provided with a plurality of openings 126 for selectively receiving a bolt 128 serving to join the bar 118 to its bracket 122.

In operation, when the prime mover 28 is energized, the blade 24 is caused to rotate continuously because of its rigid connection with spindle 26. Such rotation of spindle 26 in turn drives the tube 52 and the sleeve 64 imparting rotative motion to gear 72 by way of worm 70. When the clutch 98 is in the inoperative condition as shown in Fig. 5 of the drawings, such rotation of the shaft 74 has no effect upon the rear wheels 80. When forward movement of the lawn mower is desired, the operator guiding the mower by means of handle bar 113, shifts the handle 112 to move the clutch portions 100 and 102 into operative interengagement against the force of spring 116. It is seen that as the arm 110 is swung to rotate the pin 106 and to swing the secondary pin 108, plate 104 will be caused to move on the shaft 74 toward the gear 72, thus shifting clutch section 100 toward the clutch section 102. With the shaft 74 and clutch 98 rotating together, rotative movement will be imparted to the rear axle 82 by way of chain 86 and the two sprocket wheels 88 and 90. As the mower is guided forwardly, fallen grass will be picked up by the fingers 22 and such foliage as does not enter the space defined by arcuate walls 12 through fingers 22, will be gathered and pass into slots 29. Accordingly, the rear wheels 80 will not pass over uncut grass, weeds and the like.

The height of the blade 24 may be easily adjusted from the uppermost surface of platform 10 by merely removing the bolts 128 and shifting the bars 118 with respect to their brackets 122.

It is significant further that the entire machine may be easily serviced since blade 24 is easily removed by loosening nut 60 and removing the same from the spindle 26. The tube 52 may be driven from its position on the spindle 26 after removal of nut 58 by means of the flange 56. Prime mover 28 can then be removed by means of loosening of bolts 40 and the gear 72, as well as the sleeve 64 and bearings 68 are readily accessible through opening 38. After removal of blade 24, the entire assembly can be removed from platform 10 by removing bolts 36 and accordingly, the entire steps of manufacture as well as repair are simple and inexpensive.

Having thus described the invention what is claimed as new and desired to be secured by Letters Patent is:

1. In a power lawn mower having a horizontal platform, a wheel and axle assembly mounted on the platform, a prime mover mounted upon the platform and provided with a vertical drive spindle extending below the platform, and a cutter blade secured to the spindle below the platform, drive structure for said assembly comprising, in combination, a horizontal stub shaft carried by the platform therebelow in parallelism with the axle of said assembly; means operably connecting the shaft and said axle; a gear secured to the shaft; and a worm secured to the spindle between the platform and the cutter blade in mesh with the gear, whereby the spindle of the prime mover drives both the cutter blade and said axle.

2. In the invention as set forth in claim 1, wherein said means includes a rotatable member on the shaft and on the axle respectively, a continuous, flexible element interconnecting the members, and releasable mechanism on the shaft connecting the latter with its rotatable member, said axle being connected to its member.

3. In the invention as set forth in claim 1, wherein is provided a sleeve on the spindle, and a tube mounted on the spindle between the sleeve and the blade and joining the sleeve with the spindle, said worm being on the sleeve.

References Cited in the file of this patent

UNITED STATES PATENTS

| Number | Name | Date |
|---|---|---|
| 1,573,359 | Ruckstell | Feb. 16, 1926 |
| 1,886,537 | Evans et al. | Nov. 8, 1932 |
| 2,207,447 | Viles et al. | July 9, 1940 |
| 2,263,363 | Sejkora | Nov. 18, 1941 |
| 2,316,130 | Bohmer et al. | Apr. 6, 1943 |
| 2,429,378 | Stuebner | Oct. 21, 1947 |
| 2,491,953 | Coats | Dec. 20, 1949 |
| 2,494,662 | Hind | Jan. 17, 1950 |
| 2,498,796 | Downer | Feb. 28, 1950 |
| 2,523,439 | May | Sept. 26, 1950 |
| 2,582,177 | Swisher et al. | Jan. 8, 1952 |